(12) United States Patent
Tironi

(10) Patent No.: US 6,698,170 B2
(45) Date of Patent: Mar. 2, 2004

(54) MOWING MACHINE WITH OSCILLATING CUTTING UNIT SYSTEM

(75) Inventor: Paolo Tironi, Castel d'Ario (IT)

(73) Assignee: Rotomec S.p.A., Nogara (IT)

( * ) Notice: Subject to any disclaimer, the term of this patent is extended or adjusted under 35 U.S.C. 154(b) by 0 days.

(21) Appl. No.: 09/987,014

(22) Filed: Nov. 13, 2001

(65) Prior Publication Data

US 2002/0056261 A1 May 16, 2002

(30) Foreign Application Priority Data

Nov. 13, 2000 (IT) .................................. 2000/000020 U

(51) Int. Cl.[7] .............................................. A01D 75/30
(52) U.S. Cl. .............................. 56/6; 56/15.8; 56/15.9
(58) Field of Search ........................ 56/6, 7, 13.6, 192, 56/208, 17.1, 15.8, 15.9, 15.2, DIG. 3, DIG. 22

(56) References Cited

U.S. PATENT DOCUMENTS

| | | | | |
|---|---|---|---|---|
| 3,090,184 A | * | 5/1963 | Hadek | 56/7 |
| 3,283,486 A | * | 11/1966 | Marek et al. | 280/43.17 |
| 3,680,880 A | * | 8/1972 | Blaauw | 280/43.17 |
| 3,706,188 A | * | 12/1972 | Quiram | 56/11.6 |
| 4,478,026 A | * | 10/1984 | Mullet et al. | 56/7 |
| 4,769,976 A | * | 9/1988 | Bassett et al. | 56/7 |
| 4,854,112 A | * | 8/1989 | Holley et al. | 56/6 |
| 5,065,568 A | * | 11/1991 | Braun et al. | 56/14.9 |
| 5,715,667 A | * | 2/1998 | Goman et al. | 56/13.6 |
| 5,784,870 A | * | 7/1998 | Seegert et al. | 56/320.1 |
| 5,927,055 A | * | 7/1999 | Ferree et al. | 56/15.9 |
| 6,032,441 A | * | 3/2000 | Gust et al. | 56/7 |
| 6,047,530 A | * | 4/2000 | Bednar | 56/6 |
| 6,079,193 A | * | 6/2000 | O'Neill et al. | 56/17.1 |
| 6,276,119 B1 | * | 8/2001 | Oshima et al. | 56/17.1 |
| 6,481,194 B1 | * | 11/2002 | Brewer et al. | 56/17.2 |

* cited by examiner

*Primary Examiner*—Árpád F Kovács
(74) *Attorney, Agent, or Firm*—Young & Thompson

(57) ABSTRACT

A combined mowing machine includes a main chassis designed to be coupled to a tractor, and a plurality of cutting units connected in such a way that they can oscillate on the chassis. Each set of cutting units has a plate support beam mounted between a pair of end plates fixed to the chassis, and a pin integral with the beam. The pin slides in two slots cut into the end plates to allow the movements of the cutting unit. The mowing machine allows the cutting units to oscillate freely in order to follow the lie of the land, as a result of the double-joint oscillation and the forward/back oscillation in the slots.

7 Claims, 3 Drawing Sheets

MOWING MACHINE WITH OSCILLATING CUTTING UNIT SYSTEM

SUMMARY OF THE INVENTION

This invention relates to a combined mowing machine, preferably but not necessarily the folding type, in particular for gardening, which features an improved cutting unit connection system. In particular, the mowing machine in accordance with the invention comprises a main chassis designed to be coupled to a tractor, and a plurality of cutting units connected in such a way that they can oscillate on the chassis; each set of cutting units presents a support beam mounted between a pair of end plates fixed to the chassis, and a pin integral with the beam slides in two slots cut into the end plates to allow the movements of the cutting unit.

The second joint is provided by the hinge that connects the telescopic arms to the chassis.

The invention is characterized by the configuration of these cutting unit connection devices, which are more practical to use than known types, as they allow the plate to rise, fall and oscillate freely with no risk of jamming, and the coupling system is easily and quickly fitted.

The telescopic arms of the side wings also allow greater or lesser overlap of the cutting blades between the side and central units.

The invention, which falls into the gardening sector, relates to a combined mowing machine of the type which comprises a chassis-trailer designed to be coupled to a tractor towbar, and a set of cutting units, each constituted by a set of three blades made to rotate around a substantially vertical shaft; the cutting units are attached to frames which are connected to the main chassis-trailer in such a way that they can oscillate laterally and backwards/forwards and perform large upward and downward movements.

A transmission system of known type, with angle transmission and cardan shafts, moves the cutting parts, transferring motion from the power takeoff of the tractor.

Mowing machines of this kind are already known, and are mainly used for maintenance of large grassed areas such as sports fields, golf courses, garden lawns and the like.

The fact that the cutting parts are divided between a number of end plates hinged to the same chassis-trailer means that the machine follows the undulations of the ground better, because the various end plates move in accordance with the lie of the land, leading to partial overlap of the cutting blades.

The present invention, which falls into this sector, is designed to eliminate the drawbacks described above; for this purpose it proposes a mowing machine in which each cutting unit is fitted with a pin that slides inside a pair of end plates fixed to the telescopic arms of the chassis-trailer, and presents two appendices which are inserted into two slots cut into the end plates.

Thus all the moving parts are located between the two end plates, consequently allowing elimination of the heads of the pins which, when sliding in contact with the surface of the corresponding supports, would cause the drawbacks referred to above.

BRIEF DESCRIPTION OF THE DRAWINGS

This invention will now be described in detail, by way of example but not of limitation, with reference to the annexed figures in which.

DETAILED DESCRIPTION OF THE PREFERRED EMBODIMENTS

Figure 1:
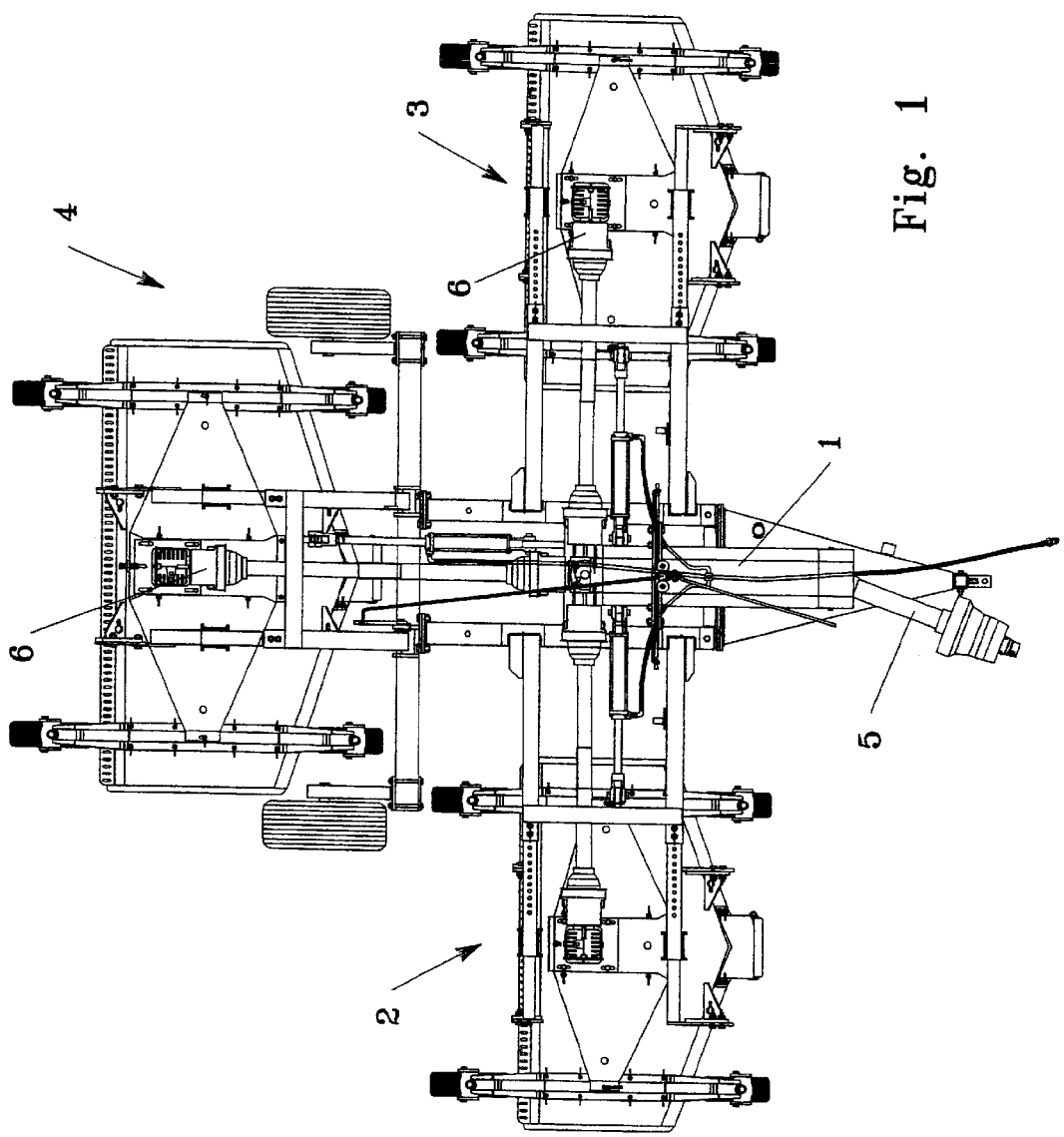
FIG. 1 schematically illustrates a mowing machine in accordance with the invention, seen from above, as a whole
Figure 2:
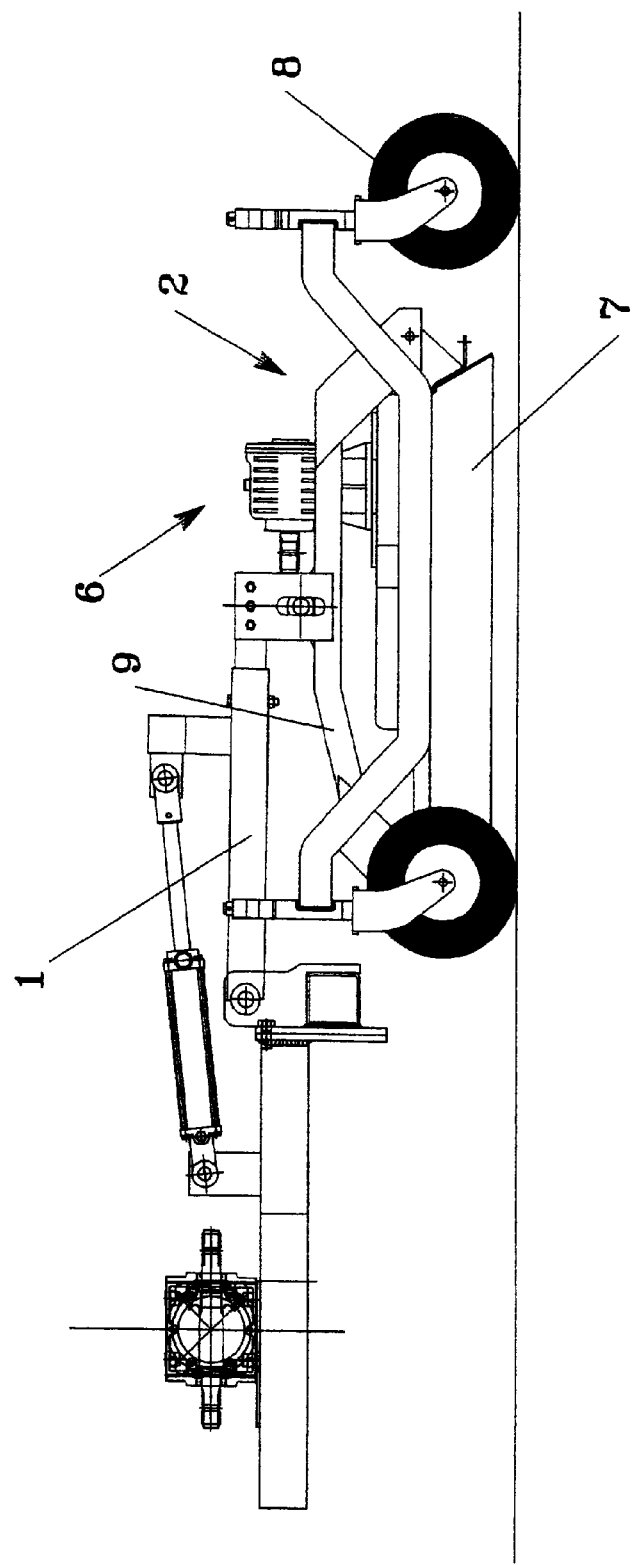
FIG. 2 is a side view of the mowing machine in accordance with the invention

By reference to FIG. 1, a mowing machine in accordance with the invention comprises a main chassis-trailer 1 designed to be coupled to a towing vehicle such as a tractor, with a set of cutting units, in this specific case three, indicated by numbers 2, 3 and 4.

A cardan shaft 5 derives motion from the power takeoff of the tractor, and transmits it via suitable transmissions 6 to each of the cutting units.

Each cutting unit comprises a frame 7 fitted with four wheels 8, the cutting parts, not shown in the figure, being fitted to the frame.

Figure 3:
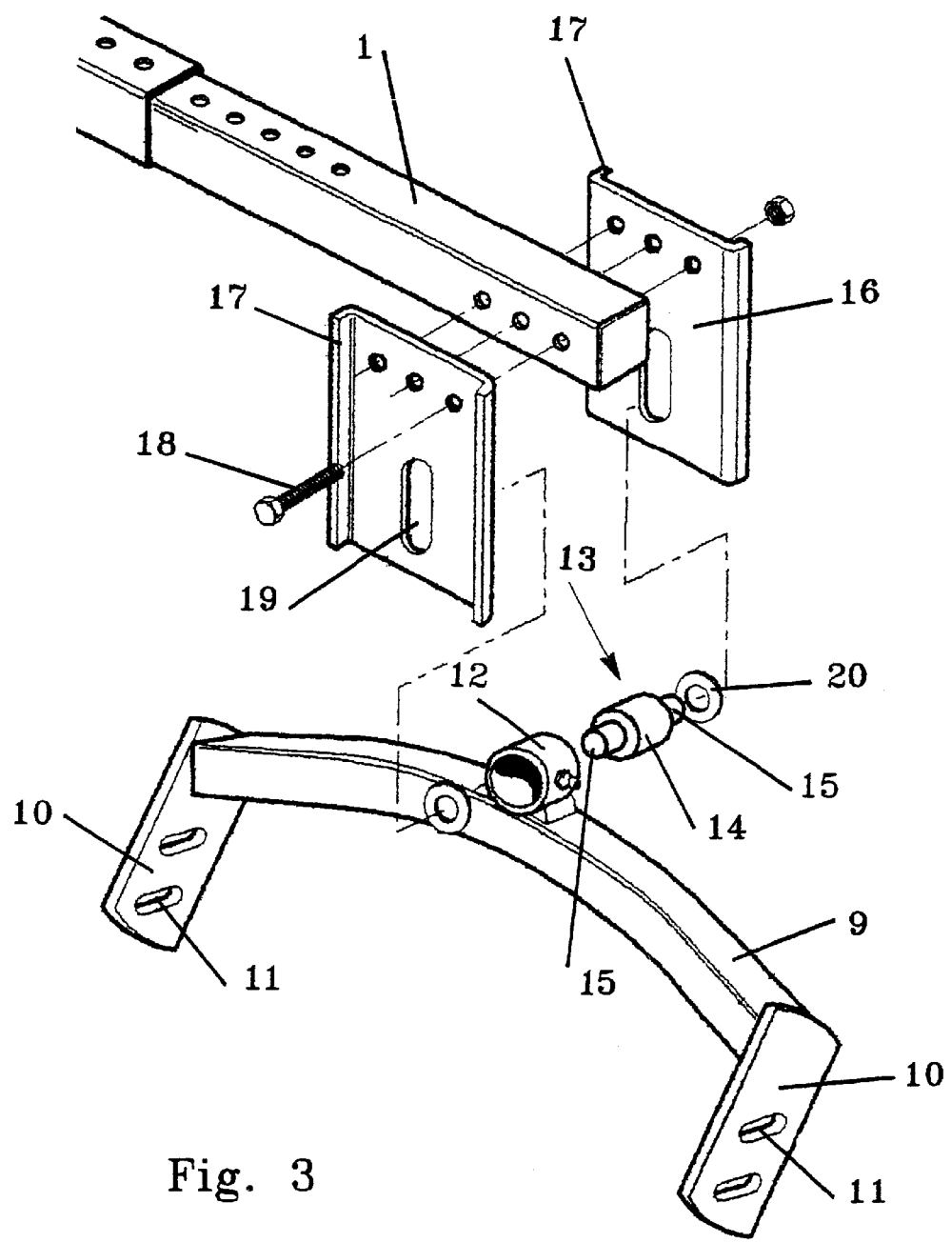
FIG. 3 is an exploded view of the system whereby the cutting units are connected to the main chassis.

Frame 7 is fitted to a support constituted by a beam indicated as 9, which is more clearly shown in FIG. 3.

Beam 9 presents a pair of plates 10 at the ends, which said plates contain holes 11 for the fixing screws of cutting unit frame 7.

A bushing 12, into which a pin 13 is inserted, is welded to the central part of beam 9.

Pin 13 is manufactured in such a way that it has the greatest diameter 14 in the central area and a width equal to bushing 12, while the diameter of the pin is reduced at the two ends 15 to allow fixing of end plates 16. Beam 9 with pin 13 is fitted on a support constituted by a pair of end plates 16, which present lateral stiffening ribs or wings 17 that are secured with bolts 18 to main chassis 1.

Each end plate contains a slot 19 in a substantially vertical position.

Pin 13 is fitted to beam 9 with the central part 14 inserted into ring 12 and the end studs 15 protruding from opposite sides.

End plates 16 are fitted over these studs, possibly with the interposition of washers 20, with studs 15 inserted into slots 19 in the end plates.

The end plates are secured to chassis 1 with bolts 18.

Advantageously, the length of body 14 of the pin is equal to the width of chassis 1 on which end plates 16 are fitted.

Thus pin 13 remains between end plates 16, with studs 15 inserted into slots 19 which act as a guide, while the body of the pin is retained in position by end plates 16.

The pin can then slide vertically in slots 19, and at the same time rotate around its own axis, thus allowing beam 9 and the cutting unit fixed to the beam to rise and rotate in order to follow the lie of the land.

This provides a far more practical connection than the known type, because the moving parts, basically consisting of the pin and studs 15, remain between end plates 16, with no external elements that slide in contact with the frame, involving the risk of jamming and wear on the paintwork. The device is also very simple to assemble, as it is sufficient to insert the pin into ring-shaped support 12, fit the end plates over the two studs 15 and then connect the end plates with the cutting unit to chassis 1, securing them with bolts 18.

Wings 17 of end plates 16 make the structure more rigid.

In conclusion, the mowing machine in accordance with the invention allows more accurate mowing due to the overlap of the blades and the fact that the cutting units can oscillate freely in order to follow the lie of the land perfectly, as a result of the double-joint oscillation and the possibility of forward/back oscillation in the slot.

The size of the mower and the materials used can obviously be varied to meet operational requirements.

What is claimed is:

1. A mowing machine comprising:

a main chassis designed to be coupled to a tractor; and three cutting units connected to said chassis so that said cutting units oscillate and slide in relation to said chassis, wherein each cutting unit has a support beam mounted between a pair of end plates fixed to the main chassis, each beam is fitted with a pin whose ends slide in two slots cut into said end plates, and wherein said pin comprises a body of a same length as a distance between said end plates, and a pair of studs projecting from opposite sides of the pin which are inserted into the slots of the end plates, a diameter of a central part of the body being greater than a width of the slots.

2. The mowing machine as claimed in claim 1, wherein the side edges of said end plates are folded outwards to form stiffening ribs.

3. The mowing machine as claimed in claim 1, wherein said end plates are bolted to the main chassis.

4. A mowing machine comprising:

a main chassis;

a plurality of end plates connected to said main chassis, each end plate having an oblong aperture extending therethrough; and a plurality of cutting units, each cutting unit having a support beam with a bushing and a pin rotatably mounted in said bushing, each pin being slidably mounted between two of said plural end plates in respective apertures, wherein each pin comprises a substantially cylindrical body having a central portion and two end portions, said two end portions having a diameter less than a diameter of said central portion, said two end portions being slidably mounted in respective apertures.

5. The mowing machine as claimed in claim 4, wherein sides of said plural end plates are outwardly curved along a length of said plural end plates.

6. The mowing machine as claimed in claim 4, wherein a longitudinal axis of each support beam is parallel to a longitudinal axis of said main chassis and each support beam only rotates about an axis perpendicular to said longitudinal axis of said main chassis.

7. The mowing machine as claimed in claim 4, wherein each support beam is substantially arcuate.

* * * * *